(12) United States Patent
Chiang et al.

(10) Patent No.: US 7,167,432 B2
(45) Date of Patent: Jan. 23, 2007

(54) READ AND WRITE SAMPLE AND HOLD SIGNAL GENERATION

(75) Inventors: Kevin Chiang, Fremont, CA (US);
Hung Chou, Fremont, CA (US);
Kouchin Huang, Milpitas, CA (US)

(73) Assignee: Zoran Corporation, Sunnyvale, CA (US)

( * ) Notice: Subject to any disclaimer, the term of this patent is extended or adjusted under 35 U.S.C. 154(b) by 808 days.

(21) Appl. No.: 10/107,595

(22) Filed: Mar. 26, 2002

(65) Prior Publication Data
US 2003/0193865 A1    Oct. 16, 2003

(51) Int. Cl.
*G11B 7/125* (2006.01)

(52) U.S. Cl. .............................. 369/59.19; 369/59.21; 369/47.35; 369/53.27

(58) Field of Classification Search ..................... None
See application file for complete search history.

(56) References Cited

U.S. PATENT DOCUMENTS

| | | | | |
|---|---|---|---|---|
| 4,283,785 A | * | 8/1981 | Miyauchi et al. | 369/116 |
| 5,347,505 A | * | 9/1994 | Moritsugu et al. | 369/59.12 |
| 5,412,626 A | * | 5/1995 | Ohno et al. | 369/13.24 |
| 5,745,468 A | * | 4/1998 | Nakano | 369/59.19 |
| 5,978,334 A | * | 11/1999 | Eastman et al. | 369/53.27 |
| 5,995,465 A | * | 11/1999 | Hayashi et al. | 369/47.28 |
| 6,111,901 A | * | 8/2000 | Taguchi et al. | 372/38.02 |
| 6,600,712 B1 | * | 7/2003 | Masui et al. | 369/116 |
| 6,721,261 B1 | * | 4/2004 | Kaku et al. | 369/116 |
| 6,842,413 B1 | * | 1/2005 | Miyaki | 369/47.53 |
| 6,904,009 B1 | * | 6/2005 | Mashimo et al. | 369/47.5 |
| 2002/0114244 A1 | * | 8/2002 | Kelly et al. | 369/53.37 |
| 2004/0179451 A1 | * | 9/2004 | Morishima et al. | 369/59.11 |

* cited by examiner

*Primary Examiner*—Wayne Young
*Assistant Examiner*—Parul Gupta
(74) *Attorney, Agent, or Firm*—Bever, Hoffman & Harms, LLP; E. Eric Hoffman

(57) ABSTRACT

A system and method for generating sample control signals for a sample and hold circuit used to control access to optical media is provided. The sample control signals are generated with sufficient duration (width) to adequately sample a reflected laser power signal. The sample control signals are defined relative to a laser power command signal generated in response to an internal data stream, rather than directly in response to the internal data stream, thereby allowing for more precise control of the sample control signals. As a result, substantial portions of each pulse of the reflected laser power signal can be sampled, without sampling transition noise that exists when the reflected laser power signal changes states. Generating the sample control signals from a laser power command signal, rather than the input data signal, more accurately time shifts the sampling command to the reflected laser power.

25 Claims, 7 Drawing Sheets

READ AND WRITE SAMPLE AND HOLD SIGNAL GENERATION

FIELD OF THE INVENTION

The present invention relates to optical media, and more particularly to a system and method for generating sampling control signals for a sample and hold circuit used to control access to the optical media.

RELATED ART

Phase changing media and write-once media, such as media used in CD writers, is written to and read from using a multi-pulse laser. A multi-pulse laser uses different laser power levels to burn data onto and read data from the media. For example, when marking a particular type of media, a write operation uses a pre-heat power level to warm up the laser, a peak power level to make an initial mark on the media, a write power level to continue making the mark, and a bias power level to cool down the laser to a non-writing level. While the commands for these power levels are digital, the resulting actual laser power level is analog.

In general, a laser power control signal is generated in response to an internal eight-to-fourteen modulation (EFM) signal. The internal EFM signal is an encoded representation of the original data to be written to the media. EFM encoding is typically used to slow down the frequency of the original data. The internal EFM signal may be viewed as pulses of varying width (from 3T to 11T, where T is a unit timing reference for data recorded on the media), called marks, separated by spaces. As the speed of a laser device increases, the effective width of a mark (i.e. the length of time that the mark is seen by the laser) decreases.

FIG. 1 is a schematic diagram illustrating a conventional EFM encoding process. Original data 150 is represented by original data waveform 155. For example, original data 150 may be a portion of a digitized song or a data file that is desired to be stored on phase changing or write-once media. Original data 150 includes two 8-bit data words: 8-bit data word 152 (i.e., "01110010") which is the binary representation of the number "114", and 8-bit data word 154 (i.e., "01111110"), which is the binary representation of the number "124". An EFM encoder 160 provides 14-bit EFM encoded data symbols in response to the 8-bit data words. Thus, EFM encoder 160 provides 14-bit EFM encoded data symbol 172 (i.e., "10010000000010") in response to 8-bit data word 152, and provides 14-bit EFM encoded data symbol 174 (i.e., "01000000000010") in response to 8-bit data word 154.

EFM encoded data symbols 172 and 174 are coupled by coupling data values 182, 184, and 186 to form internal EFM data stream 180. These coupling data values are inserted between adjacent EFM encoded data symbols to ensure that EFM encoding requirements (e.g. a minimum pulse width of 3T) are met across the symbols. Internal EFM data stream 180 can be represented by internal EFM signal 185. As shown, internal EFM signal 185 includes marks (i.e., pulses) 187 and 189, having widths equal to 9T and 3T, respectively. The areas between marks 187 and 189 are referred to as spaces.

Internal EFM signal 185 is processed to create a laser power control signal, which controls the actual power of the laser used to write marks and spaces to the media. The actual laser power is shown as actual laser power signal 195. The marks written to the media are defined by the writtern pattern of marks and spaces 190. Actual laser power 195 is delayed from internal EFM signal 185, such that the written pattern of marks and spaces 190 is delayed with respect to the internal EFM signal 185. As illustrated, marks are made in phase changing or write-once media by increasing the power to the laser for a period of time. Spaces are left in the media by decreasing the power to the laser to a non-writing bias level. In this way, original data is written to the media.

As illustrated, actual laser power 195 exhibits overshoot and undershoot conditions during transitions between commanded laser power levels. The variations in the actual laser power during transitions between power levels (including overshoot and undershoot conditions) are hereinafter referred to as transition noise. Transition noise undesirably increases as operating speed increases.

A reflection of the actual laser power 195 is used to generate a reflected laser power signal, which is representative of the actual laser power signal 195. The reflected laser power signal is sampled, thereby generating a sampled laser power signal. The sampled laser power signal is used for many purposes, including automatic power control (APC) processing, servo processing, wobble processing, optimal power control (OPC) functions, and runtime OPC (ROPC) functions. It is therefore desirable for the sampled laser power signal to be an accurate representation of the actual laser power 195.

FIG. 2 is a block diagram of a conventional system 200 used to sample the reflected laser power signal during marks and spaces. System 200 includes write strategy circuit 210, laser power generator 220, sample and hold circuit 230, and laser system 240. Write strategy circuit 210 includes a list of parameters used for writing data to a phase changing or write-once media. Write strategy circuit 210 generates an EFM1 control signal, a runtime optimum power control (ROPC) signal and a read sample (RESMP) signal directly in response to the internal EFM signal (e.g., internal EFM signal 185). Laser power generator 220 generates a laser power control signal (LPC) in response to the EFM1 control signal. Laser system 240 generates a multi-pulse laser beam in response to the LPC signal. Laser system 240 further provides a reflected laser power signal (R_LASER_POWER) representative of the actual power of the multi-pulse laser beam. Sample and hold circuit 230 samples the R_LASER_POWER signal in response to the ROPC and RESMP signals, thereby creating a sampled laser power siynal (S_LASER_POWER) . The ROPC signal causes sample and hold circuit 230 to sample the marks of the R_LASER_POWER signal. The RESMP signal causes sample and hold circuit 230 to sample the spaces of the R_LASER_POWER signal.

Write strategy circuit 210 typically generates the ROPC and RESMP signals using either a fixed mode or a variable mode.

FIG. 3 is a timing diagram illustrating the use of two different ROPC signals, $ROPC_A$ and $ROPC_B$, in accordance with two different conventional fixed mode methods. (The RESMP signal is not shown in FIG. 3 for purposes of clarity.) In the fixed mode, the ROPC and RESMP signals have fixed pulse widths, and are generated at fixed times from predetermined edges of the internal EFM signal. In the described example, the internal EFM signal includes current mark MK, following space FS and following mark FM. In the illustrated example, current mark MK has a width of 3T, following space FS has a width of 7T and following mark FM has a width of 11T. If write strategy circuit 210 is controlled to generate the $ROPC_A$ signal, then pulses FP1 and FP2 (each having a fixed width of 3T) are generated in response to the rising edges of marks MK and FM, respectively. The rising edge of pulse FP1 occurs with a delay of D1 with respect to the rising edge of current mark MK. Delay D1 results from delays inherent in the write strategy circuit 210.

Sample and hold circuit 230 samples the R_LASER_POWER signal while fixed pulses FP1 and FP2 are asserted. In general, pulse FP1 exhibits an appropriate width for sampling the associated 3T pulse in the R_LASER_POWER signal (even though pulse FP1 is not optimal because it samples transition noise). However, pulse FP2 is much shorter than the associated 11T pulse in the R_LASER_POWER signal. Thus, pulse P2 does not exhibit an appropriate width for sampling the associated 11T pulse in the R_LASER_POWER signal.

However, if the pulse width of the ROPC signal is widened, then other problems will exist. For example, if write strategy circuit 210 is controlled to generate the $ROPC_B$ signal (instead of the $ROPC_A$ signal), then fixed pulses FP3 and FP4 (each having a width of 9T) are generated in response to the rising edges of marks MK and FM, respectively. Sample and hold circuit 230 samples the R_LASER_POWER signal while pulses FP3 and FP4 are asserted. Pulse FP4 exhibits a width that enables the associated 11T pulse in the R_LASER_POWER signal to be adequately sampled (even though pulse FP4 is not optimal because it samples transition noise). However, pulse FP3 exhibits a width that is much larger than the associated 3T pulse in the R_LASER_POWER signal. Thus, pulse FP3 would undesirably cause transition noise and a portion of a space to be sampled. As a result, pulse FP3 might not be generated in some fixed mode schemes, undesirably resulting in a reduced number of sample points.

Another deficiency of the fixed mode is illustrated by FIG. 3. That is, as the operating speed is increased, the transition noise of the reflected laser power signal R_LASER_POWER also increases. As a result, the $ROPC_A$ and $ROPC_B$ signals undesirably sample the transition noise at the leading edges of the marks of the R_LASER_POWER signal. Because delay D1 is fixed, there is no way to avoid sampling this transition noise. Note that the fixed mode presents similar problems when using the RESMP signal to sample the spaces in the R_LASER_POWER signal (e.g., the space resulting from the following space FS).

FIG. 4 is a timing diagram illustrating the generation of the ROPC and RESMP signals using a conventional variable mode. In variable mode, the pulse width of both the ROPC and the RESMP signals have variable widths, defined by fixed delays from predetermined edges of the internal EFM signal. In the described example, the internal EFM signal includes a current mark MK having a width of 7T and a following space FS having a width of 9T. The ROPC signal includes a pulse VP1, which is asserted with a delay of D1 (e.g., 2T) with respect to the rising edge of the current mark MK. ROPC pulse VP1 is de-asserted at a time D2 (e.g. 1T), prior to the falling edge of the current mark MK. ROPC pulse VP1 therefore has a width equal to the width of the current mark (7T), minus D1 (2T), minus D2 (1T), or 4T. Thus, the duration of ROPC pulse VP1 is less than the width of the current mark MK. Sample and hold circuit 230 samples the R_LASER_POWER signal while the ROPC signal is asserted (e.g., during ROPC pulse VP1).

As with the fixed width mode, the width (e.g., 4T) of ROPC pulse VP1 should be large enough to allow adequate sampling of the reflected laser power signal R_LASER_POWER. However, the ROPC pulse VP1 is typically not generated unless the sum of widths D1 and D2 is greater than the width of the current mark MK. For example, the ROPC pulse VP1 would not be generated if the current mark MK had a width of 3T (or possibly 4T). As a result, the variable mode does not enable shorter marks of the reflected laser power signal R_LASER_POWER to be sampled. If too few ROPC pulses are generated, then the resulting S_LASER_POWER signal is not representative of the actual laser power.

Another deficiency of the variable mode is illustrated by FIG. 4. That is, as the operating speed is increased, the transition noise of the reflected laser power signal R_LASER_POWER also increases. As a result, the ROPC signal undesirably samples the transition noise at the leading edges of the marks of the R_LASER_POWER signal. Because delay D1 is fixed, there is no way to avoid sampling this transition noise. Note that the variable mode presents similar problems when using the RESMP signal to sample the spaces in the R_LASER_POWER signal (e.g., the space resulting from the following space FS).

It would therefore be desirable to have a method for generating the ROPC and RESMP signals that overcomes the above described deficiencies of the prior art. More specifically, it would be desirable to have a variable mode method of generating the ROPC and RESMP signals, such that these signals exhibit acceptable widths for sampling the reflected laser power signal. It would further be desirable for this variable mode method to generate ROPC and RESMP signals capable of avoiding the sampling of transition noise in the reflected laser power signal. Moreover, it would be desirable for this variable mode method to be implemented without requiring extensive additional circuitry.

SUMMARY

Accordingly, the present invention includes a method and structure for generating ROPC and RESMP sampling control signals for a sample and hold circuit that ensures sufficient sampling duration and allows for delay compensation.

In one embodiment of the present invention, the ROPC and RESMP sampling control signals are defined from one or more laser power control signals, other than the internal EFM signal, thereby providing more accurate sampling control signals. For example, the ROPC and RESMP sampling control signals can be derived from the EFM1 signal provided at the output terminal of a write strategy circuit, rather than directly from the internal EFM signal provided to the input terminal of the write strategy circuit. In addition, the falling edges of these ROPC and RESMP sampling control signals are enabled to extend beyond the corresponding edges of the internal EFM signal. As a result, the ROPC and RESMP sampling control signals are accurately aligned with the different phases (marks and spaces) of the reflected laser power signal. Consequently, the sampled laser power can be determined more accurately.

In accordance with one embodiment, a user programmable delay circuit is implemented to enable a first user selected delay to be added between the rising edges of the EFM1 signal and the rising edges of the ROPC sampling control signal. The user programmable delay circuit also enables a second user selected delay to be added between the falling edges of the EFM1 signal and the falling edges of the ROPC sampling control signal. These user selected delays can be chosen to ensure that all marks can be sampled, even the smallest (3T) marks.

The first user selected delay can also be selected such that the ROPC sampling control signal is not asserted until after the transition noise of a mark has subsided, and the reflected laser power signal has stabilized for the mark.

The user programmable delay circuit can also be used to enable a third user selected delay to be added between the falling edges of the EFM1 signal and the rising edges of the RESMP sampling control signal. The user programmable delay circuit can also enable a fourth user selected delay to be added between the rising edges of the EFM1 signal and the falling edges of the RESMP sampling control signal. The third and fourth user selected delays can be chosen to ensure that all spaces can be sampled.

The third user selected delay can also be selected such that the RESMP sampling control signal is not asserted until after the transition noise of a space has subsided, and the reflected laser power signal has stabilized for the space.

The sampled laser power signal obtained by sampling the reflected laser power signal with the ROPC and RESMP sampling control signals in accordance with the present invention may be used in a feedback circuit to control various functions in the system that uses the laser. For example, the sampled laser power signal may be used for automatic power control, servo processing, wobble processing, optimal power control (OPC) functions, and runtime OPC (ROPC) functions.

The present invention will be more fully understood in view of the following description and drawings.

DETAILED DESCRIPTION

As described below, a write strategy circuit is used to generate ROPC1 and RESMP1 sampling control signals in response to a laser power control signal EFM1, rather than directly in response to an internal EFM signal. The laser power control signal EFM1 is generated in response to the internal EFM signal. Generating the ROPC1 and RESMP1 sampling control signals in response to the EFM1 signal causes these sampling control signals to be more closely aligned with the data to be sampled.

A user programmable delay circuit is used to generate the ROPC1 and RESMP1 sampling control signals in response to the EFM1 signal. The user programmable delay circuit allows the various edges of the ROPC1 and RESMP1 sampling control signals to be time shifted with respect to corresponding edges of the EFM1 signal. The amount of time shifting is determined by the user by programming the user programmable delay circuit to store user-selected delays. By choosing the user-selected delays in the appropriate manner, the ROPC1 and RESMP1 sampling control signals are able to sample all marks and spaces, including the marks and spaces having a minimum width. Moreover, by appropriately choosing the user selected delays, the widths of the ROPC1 and RESMP1 sampling control signals can be selected to avoid sampling transition noise. In this manner, the ROPC1 and RESMP1 sampling control signals exhibit improved on-chip delay control.

Figure 1:
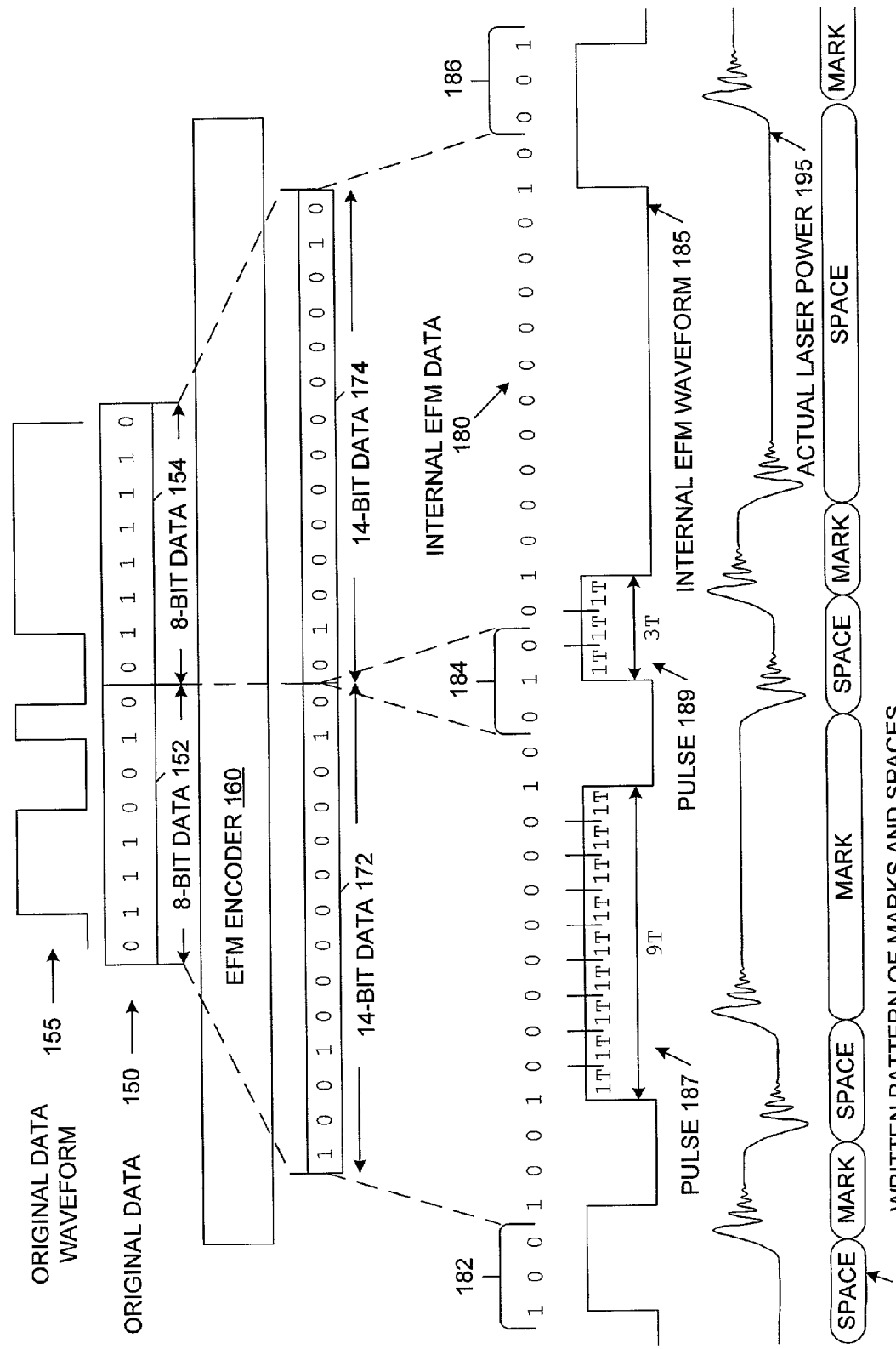
FIG. 1 is a schematic diagram of a conventional EFM encoding process.
Figure 2:
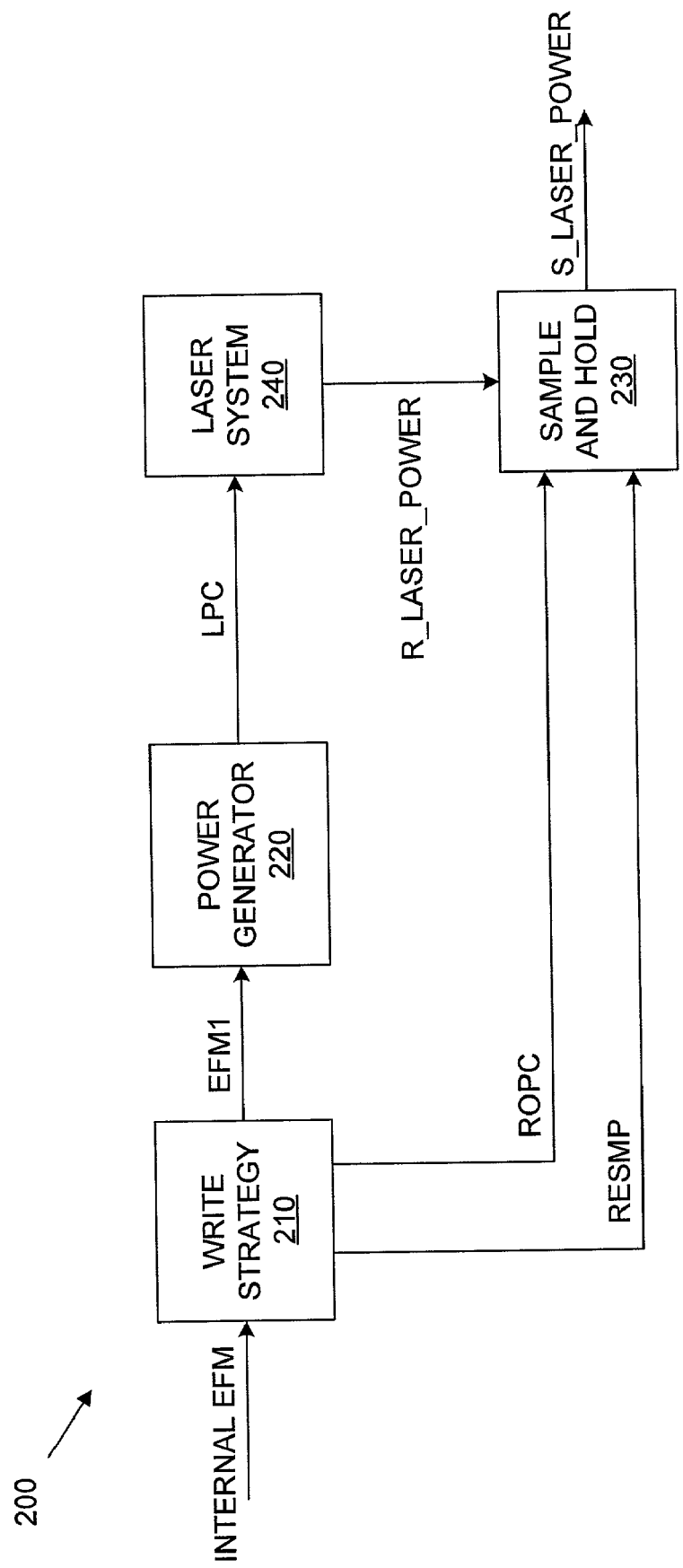
FIG. 2 is a block diagram of a conventional power sampling circuit.
Figure 3:
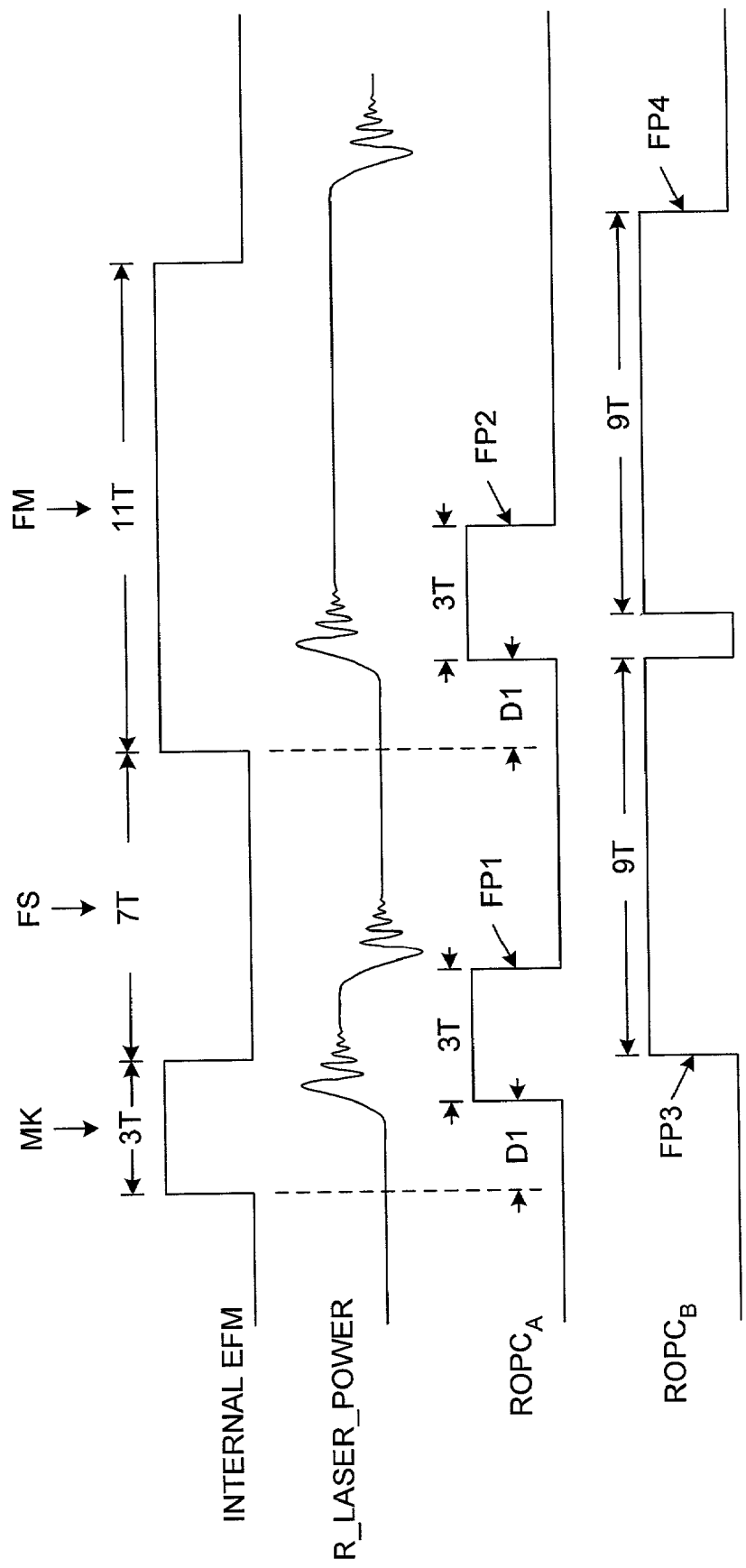
FIG. 3 is a timing diagram illustrating conventional fixed mode power sampling.
Figure 4:
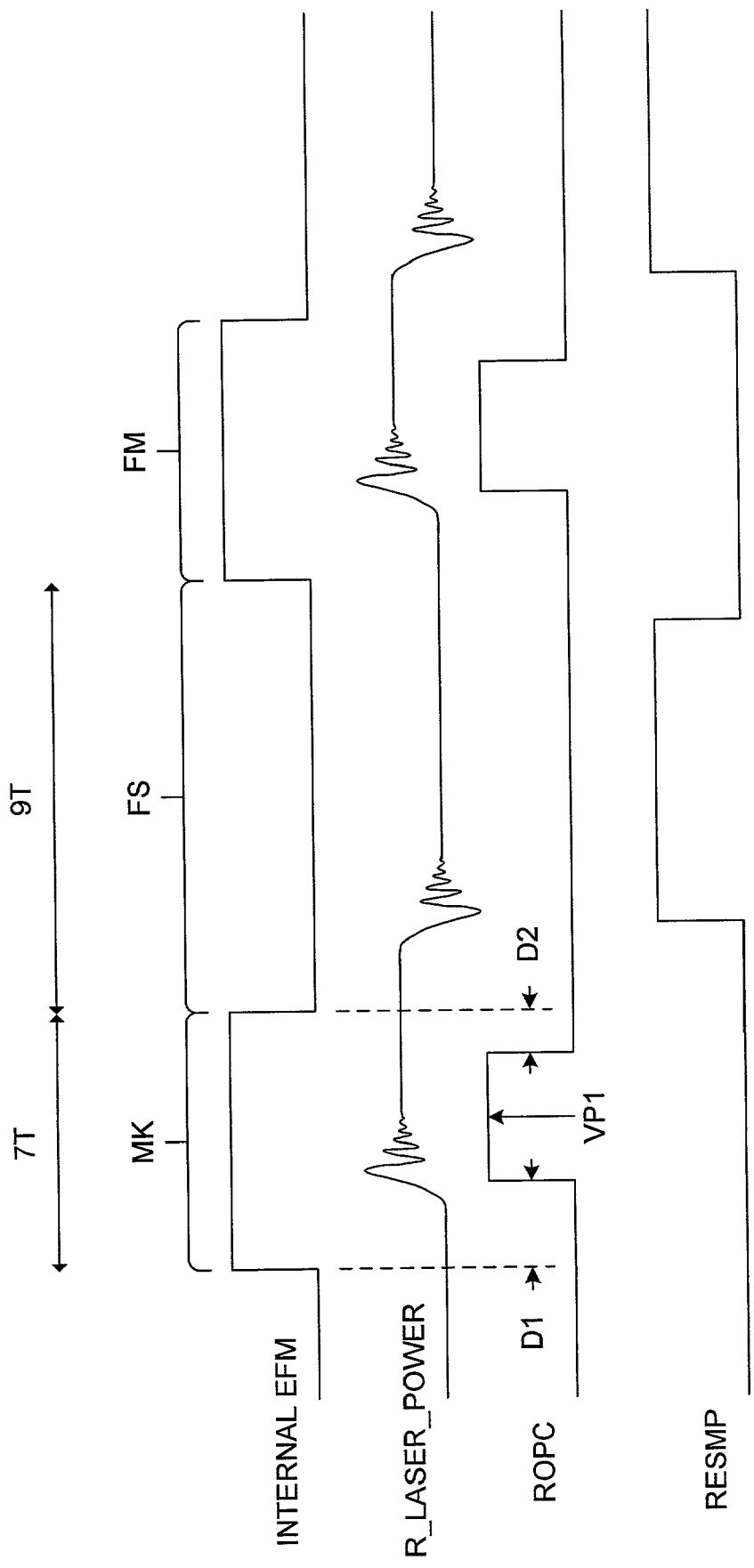
FIG. 4 is a timing diagram illustrating conventional variable mode of power sampling.
Figure 5:
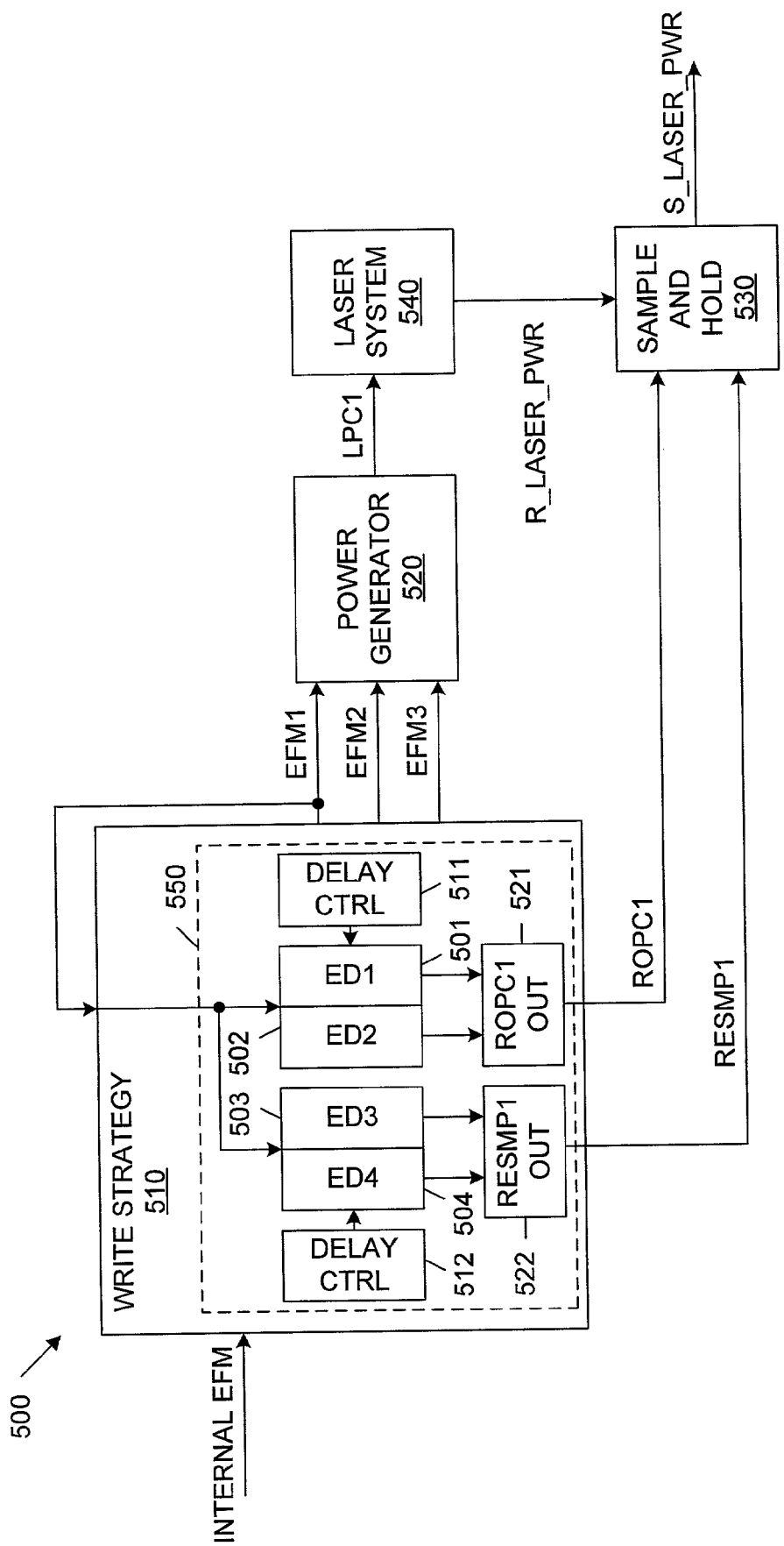
FIG. 5 is a block diagram of a power sampling circuit in accordance with an embodiment of the present invention.

FIG. 5 is a block diagram of a power sampling circuit 500 in accordance with an embodiment of the present invention. Power sampling circuit 500 includes write strategy circuit 510, power generator 520, sample and hold circuit 530, and laser system 540. Write strategy circuit 510 includes user programmable delay circuit 550, which in turn, includes delay lines 501–504, programmable delay control circuits 511–512, ROPC1 output control circuit 521 and RESMP1 output control circuit 522. Write strategy circuit 510 generates a plurality of laser control signals EFM1, EFM2, and EFM3, in response to an internal EFM signal (wherein the internal EFM signal has been described above in connection with FIG. 1). Laser control signals EFM1, EFM2 and EFM3 are generated in a manner known to those of ordinary skill in the art.

In accordance with one embodiment of the present invention, laser control signal EFM1 is used as a feedback signal by write strategy circuit 510. Write strategy circuit 510 generates the ROPC1 and RESMP1 sampling control signals in response to the EFM1 signal, rather than the internal EFM signal. As described in more detail below, the delays inherent in the EFM1 signal enables the sampling pulses of the ROPC1 and RESMP1 signals to more accurately correspond with actual marks and spaces in a reflected laser power signal.

Power generator 520 provides a laser power control signal (LPC1) in response to the laser control signal EFM1 and one or more (or none) of the laser control signals EFM2 and EFM3. Laser system 540 generates a multi-pulse laser beam that exhibits an actual laser power in response to the LPC1 signal. Laser system 540 further provides a reflected laser power signal (R_LASER_PWR) representative of the actual laser power of the multi-pulse laser beam. Sample and hold circuit 530 samples the R_LASER_PWR signal in response to the ROPC1 and RESMP1 signals, thereby creating a sampled laser power signal (S_LASER_PWR). The ROPC1 signal is controlled to cause sample and hold circuit 530 to sample the marks of the R_LASER_PWR signal. The RESMP1 signal is controlled to cause sample and hold circuit 530 to sample the spaces of the R_LASER_PWR signal. The sampled laser power signal S_LASER_PWR may be used to implement various functions, including but not limited to, automatic power control (APC), servo processing, wobble processing, optimal power control (OPC) functions, and runtime OPC (ROPC) functions.

Figure 6:
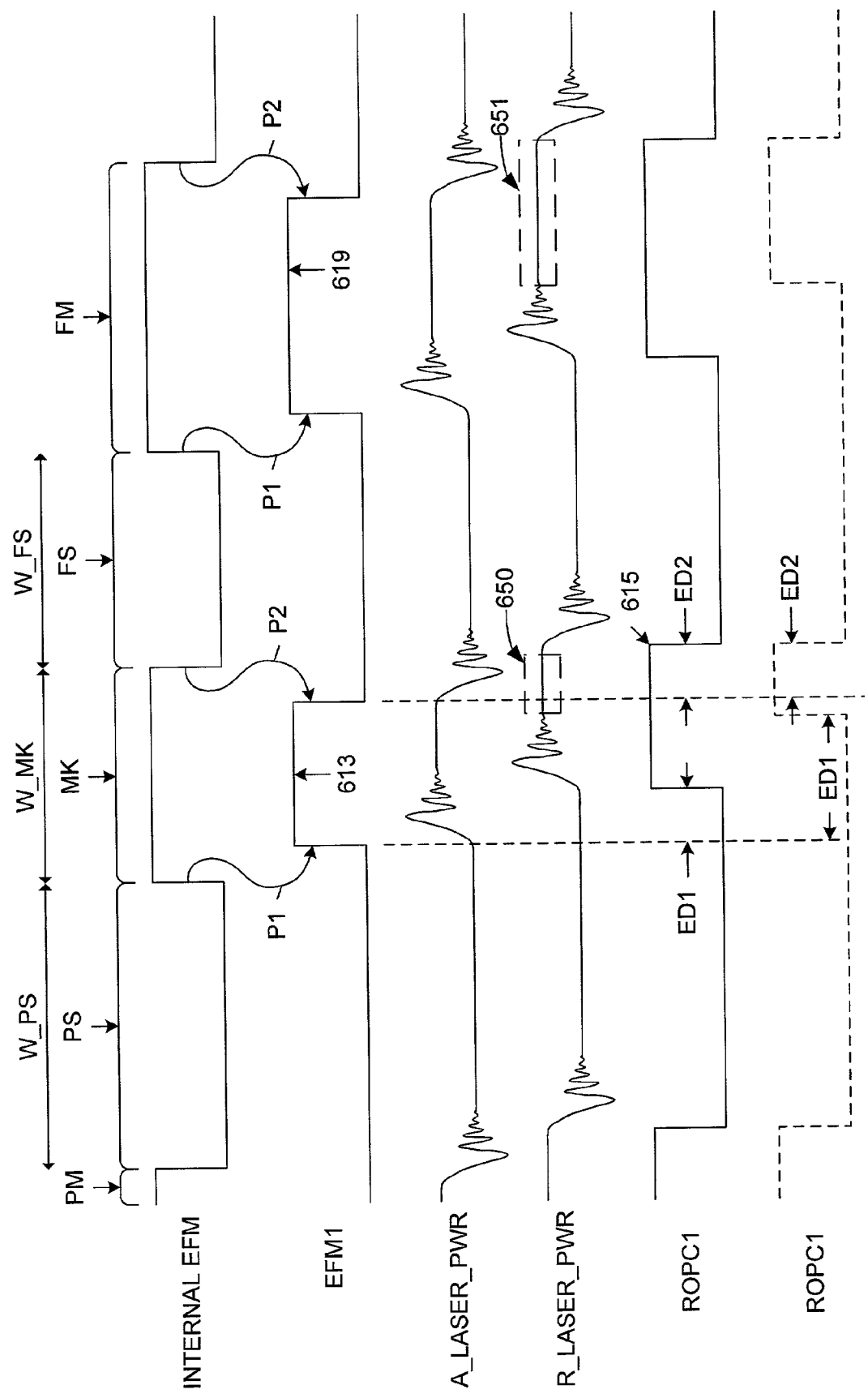
FIG. 6 is a timing diagram of a variable mode of mark power sampling in accordance with an embodiment of the present invention.

FIG. 6 is a timing diagram of a variable mode of write power sampling implemented by power sampling circuit 500 in accordance with one embodiment of the present invention. The internal EFM signal is created by performing eight-to-fourteen modulation on an input data signal in the manner illustrated in FIG. 1. The internal EFM signal includes a pre-mark PM, a pre-space PS, a current mark MK, a following space FS, and a following mark FM, all defined relative to the current mark MK. Pre-space PS exhibits associated width W_PS, current mark MK exhibits associated width W_MK, and following space FS exhibits associated width W_FS. Each mark (and space) within the internal EFM signal has a pulse width between 3T and 11T.

In the present example, the EFM1 signal is generated in response to the internal EFM signal. The EFM1 signal is asserted high a first period P1 after the rising edge of the current mark MK of the internal EFM signal. The EFM1 signal is de-asserted low at a time period P2 prior to the falling edge of the current mark MK of the internal EFM signal, thereby creating EFM1 pulse 613. A second EFM1 pulse 619 is similarly created in the EFM1 signal in response to the following mark FM. The EFM1 signal is used (alone or in combination with the EFM2 and EFM3 signals) by power generator 520 (FIG. 5) to generate the laser power command control signal LPC1. Laser system 540 generates the multi-pulse laser beam having an actual laser power (A_LASER_PWR) in response to the LPC1 signal. Delays within laser system 540 result in a time shift between the actual laser power signal A_LASER_PWR and the reflected laser power signal R_LASER_PWR. These system delays are typically introduced into the reflected laser power signal by sources such as the optical system design, the electronic amplifier circuit, and the flex cables carrying the signal. The reflected laser power signal R_LASER_PWR is applied to sample and hold circuit 530 (FIG. 5).

Write strategy circuit 510 asserts the ROPC1 signal high at a time period ED1 after the rising edge of the EFM1 signal pulse 613. Write strategy circuit 510 subsequently de-asserts the ROPC1 signal low at a time period ED2 after the falling edge of EFM1 signal pulse 613, thereby creating ROPC1 pulse 615. This ROPC1 pulse 615 therefore has a width equal to the width of EFM1 pulse 613, minus time period ED1, plus time period ED2. By defining the width of ROPC1 pulse 615 in response to the EFM1 signal, rather than the internal EFM signal, the effects of system delays between receipt of the internal EFM signal and the generation of the EFM1 signal are advantageously removed from the sampling process.

If the time periods ED1 and ED2 are selected to be equal to the system delay between the EFM1 signal and the reflected laser power signal, then the ROPC pulse 615 will closely correspond with the associated reflected laser power signal pulse, as illustrated by the ROPC1 signal in FIG. 6.

However, the ROPC1 signal of FIG. 6 undesirably samples transition noise at the rising edge of the reflected laser power signal R_LASER_PWR. In view of this, the user can make the time period ED1 longer, thereby generating the ROPC1' signal illustrated in dashed lines in FIG. 6. The ROPC1' signal advantageously avoids sampling the transition noise at the rising edges of the reflected laser power signal R_LASER_PWR. Consequently, the ROPC1' signal accurately samples the stable areas 650–651 of the R_LASER_PWR signal.

User programmable delay circuit 550 of write strategy circuit 510 operates in the following manner to generate the ROPC1 sampling control signal in accordance with one embodiment of the present invention. The user of circuit 500 writes delay values representative of the desired time periods ED1 and ED2 to delay control circuit 511. Delay control circuit 511 then applies these user-selected delay values to programmable delay lines 501 and 502, thereby causing these delay lines 501 and 502 to exhibit delays equal to time periods ED1 and ED2, respectively. Both of delay lines 501 and 502 are coupled to receive the EFM1 signal.

Each rising edge of the EFM1 signal is propagated through delay line 501, such that delay line 501 provides an output signal having a rising edge at time ED1 after the rising edge of the EFM1 signal. ROPC1 output control circuit 521 asserts the ROPC1 signal upon detecting a rising edge from delay line 501.

Similarly, each falling edge of the EFM1 signal is propagated through delay line 502, such that delay line 502 provides an output signal having a falling edge at time ED2 after the falling edge of the EFM1 signal. ROPC1 output control circuit 521 de-asserts the ROPC1 signal upon detecting the falling edge from delay line 502.

In this manner, programmable delay control circuit 511, delay lines 501–502 and ROPC1 output control circuit 521 generate the ROPC1 signal in the manner illustrated by FIG. 6. Although particular logic has been described for generating the ROPC1 signal, it is understood that other logic can be used to generate the ROPC1 signal in accordance with the present embodiment.

In one embodiment, time periods ED1 and ED2 are each programmably defined by the user as a period of time between 0T and (63/8)T. The resolution of the selectable delay periods is equal to (1/8)T. In one variation, time period ED1 is programmably defined as a period of time between 0T and (127/8)T. Time period ED1 is selected to represent an estimate of the system delays between the actual laser power signal A_LASER_PWR (commanded by the EFM1 signal) and the starting portion of reflected laser power signal R_LASER_PWR to be sampled. In other words, time period ED1 represents the amount of delay from the time that an EFM1 pulse is asserted until the time that sample and hold circuit 530 (FIG. 5) starts sampling reflected laser power signal R_LASER_PWR in response to the ROPC1 signal.

Time period ED2 is selected, in conjunction with time period ED1, to ensure that the ROPC1 pulse extends to the end of the associated pulse in the reflected laser power signal R_LASER_PWR. By selecting time period ED2 to be approximately equal to the above-described system delay, the falling edge of the ROPC1 pulse will extend to the end of the associated pulse in the reflected laser power signal. As a result, the ROPC1 pulses accurately correspond with the corresponding pulses in the reflected laser power signal R_LASER_PWR. Controlling the ROPC1 signal in this manner ensures that ROPC1 pulses will be generated for all pulses in the reflected laser power signal, even the pulses having the smallest width of 3T.

Returning now to the EFM1 signal, it is noted that time periods P1 and P2 are variable delays. Time period P1 is a function of the width of current mark MK and the width of pre-space PS of the internal EFM signal, as defined, for example, in a table look-up of pre-space widths and current mark widths. Time period P1 can also be a function of pre-mark PM. Time period P2 is a function of the width of the current mark MK and the following space FS of internal EFM signal, as defined, for example, in a table look-up of current mark widths and following space widths. Time period P2 may additionally include a fixed value portion. Time periods P1 and P2 are chosen to adapt the width of the EFM1 signal to the data surrounding the current mark MK. For example, if the pre-space PS is small and the pre-mark PM is large, then a small value is chosen for period P1 to compensate for a warmer-than-normal laser. Thus, EFM1 pulse 613 is adapted to the surrounding data through the use of time periods P1 and P2. In such an embodiment, ROPC1 pulse 615 is also beneficially adapted to the surrounding data by depending from the EFM1 signal.

Figure 7:
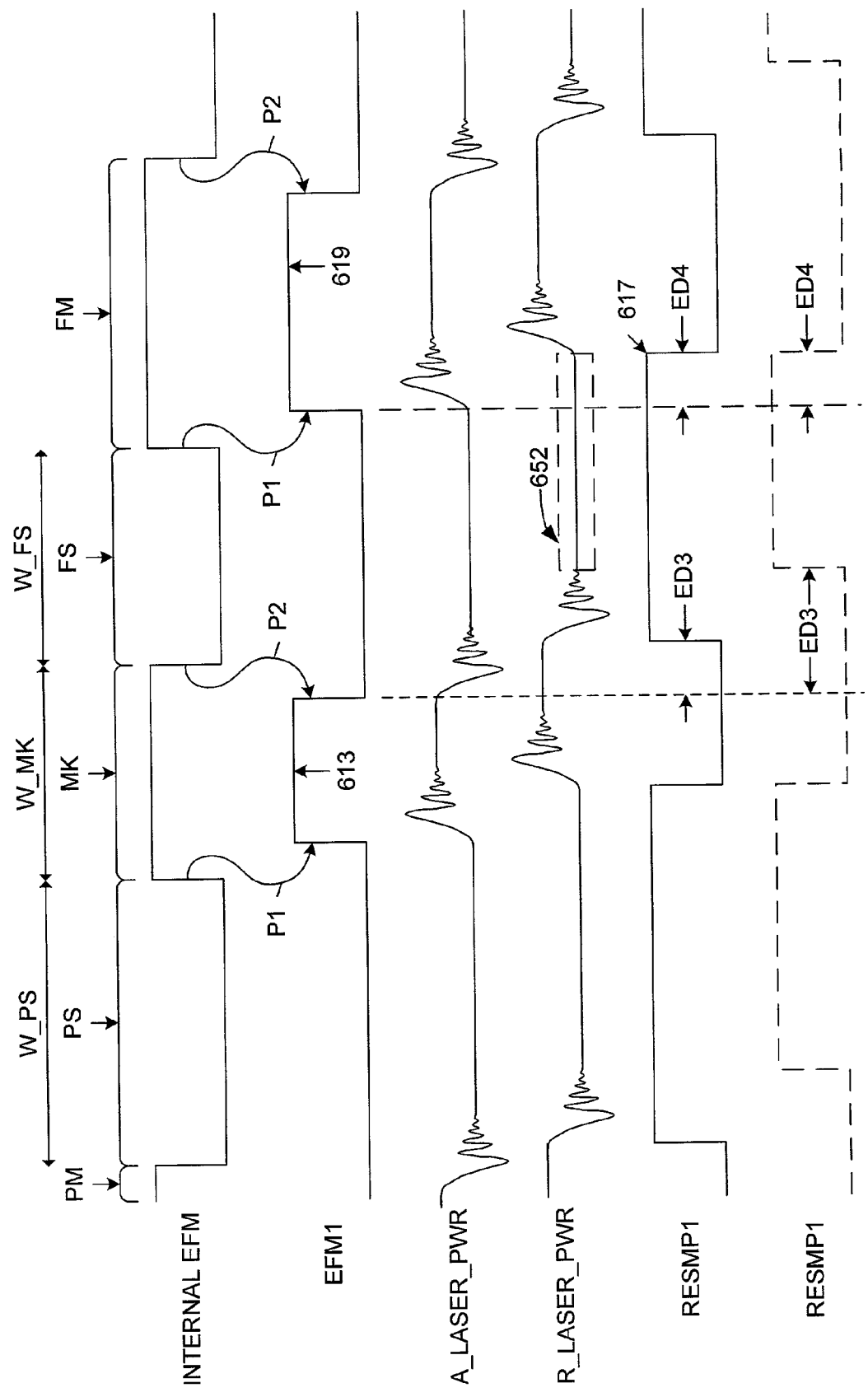
FIG. 7 is a timing diagram of a variable mode of space power sampling in accordance with another embodiment of the present invention.

FIG. 7 is a timing diagram of a variable mode of write power sampling in accordance with an embodiment of the present invention. The internal EFM signal, the EFM1 signal, the actual laser power signal A_LASER_PWR, and the reflected laser power signal R_LASER_PWR are generated as described above with respect to FIG. 6. Thus, the EFM1 signal includes EFM1 pulses 613 and 619, as described above. Write strategy circuit 201 generates the RESMP1 sampling control signal to enable the spaces of the reflected laser power signal R_LASER_PWR to be sampled.

Like the ROPC1 signal, the RESMP1 signal is generated in response to the EFM1 signal, rather than the internal EFM signal. Thus, the RESMP1 signal is asserted high a programmable time period ED3 after the falling edge of EFM1 pulse 613. The RESMP1 signal is subsequently de-asserted low at a programmable time period ED4, after the rising edge of EFM1 pulse 619, thereby creating an RESMP1 pulse 617. This RESMP pulse 617 has a width equal to the width of the space between EFM1 pulses 613 and 619, minus time period ED3, plus time period ED4. As noted above, defining the width of RESMP pulse 617 in response to the EFM1 signal, rather than internal EFM signal, causes the effects of system delays between receipt of internal EFM signal and the generation of EFM1 signal to be advantageously removed from the sampling process.

If the time periods ED3 and ED4 are selected to be equal to the system delay between the EFM1 signal and the reflected laser power signal, then the RESMP1 pulse 617 will closely correspond with the associated reflected laser power signal pulse, as illustrated by the RESMP1 signal in FIG. 7.

However, the RESMP1 signal of FIG. 6 undesirably samples transition noise at the falling edges of the reflected laser power signal R_LASER_PWR. In view of this, the user can make the time period ED3 longer, thereby generating the RESMP1' signal illustrated in dashed lines in FIG. 7. The RESMP1' signal advantageously avoids sampling the transition noise at the falling edges of the reflected laser power signal R_LASER_PWR. Consequently, the RESMP1' signal accurately samples the stable areas (e.g., area 652) of the R_LASER_PWR signal.

User programmable delay circuit 550 of write strategy circuit 510 operates in the following manner to generate the RESMP1 sampling control signal in accordance with one embodiment of the present invention. The user of circuit 500 writes delay values representative of time periods ED3 and ED4 to delay control circuit 512. Delay control circuit 512 then applies these delay values to programmable delay lines 503 and 504, thereby causing these delay lines 503 and 504 to exhibit delays equal to time periods ED3 and ED4, respectively. Both of delay lines 503 and 504 are coupled to receive the EFM1 signal.

Each falling edge of the EFM1 signal is propagated through delay line 503, such that delay line 503 provides an output signal having a falling edge at time ED3 after the falling edge of the EFM1 signal. RESMP1 output control circuit 522 asserts the RESMP1 signal upon detecting a falling edge from delay line 503.

Similarly, each rising edge of the EFM1 signal is propagated through delay line 504, such that delay line 504 provides an output signal having a rising edge at time ED4 after the rising edge of the EFM1 signal. RESMP1 output control circuit 522 de-asserts the REAMP1 signal upon detecting the rising edge from delay line 504.

In this manner, programmable delay control circuit 512, delay lines 503-504 and RESMP1 output control circuit 522 generate the RESMP1 signal in the manner illustrated by FIG. 7. Although particular logic has been described for generating the RESMP1 signal, it is understood that other logic can be used to generate the RESMP1 signal in accordance with the present embodiment.

In one embodiment, time periods ED3 and ED4 are each programmably defined by the user as a period of time between 0T and (63/8)T, with a resolution of (1/8)T. In one variation, time ED3 is programmably defined as a period of time between 0T and (127/8)T. Time period ED3 is selected to represent an estimate of the system delays between the actual laser power signal A_LASER_PWR (commanded by the EFM1 signal) and the reflected laser power signal R_LASER_PWR to be sampled. In other words, time period ED3 represents the amount of delay from the time that an EFM1 pulse is de-asserted until the time that sample and hold circuit 530 (FIG. 5) starts sampling reflected laser power signal R_LASER_PWR in response to the RESMP1 signal.

Time period ED4 is selected, in conjunction with time period ED3, to ensure that the RESMP1 pulse extends to the end of an associated space in the reflected laser power signal R_LASER_PWR. By selecting time period ED4 to be approximately equal to the above-described system delay, the falling edge of the RESMP1 pulse will extend to the end of the associated space in the reflected laser power signal. As a result, the RESMP1 pulses accurately correspond with the corresponding spaces in the reflected laser power signal R_LASER_PWR. Controlling the RESMP1 signal in this manner ensures that RESMP1 pulses will be generated for all spaces in the reflected laser power signal, even the spaces having the smallest width.

In the various embodiments of this invention, novel structures and methods have been described to generate ROPC1 and RESMP1 signals for controlling a sample and hold circuit. The various embodiments of the methods of this invention that are described above are illustrative only of the principles of this invention and are not intended to limit the scope of the invention to the particular embodiments described. For example, in view of this disclosure, those skilled in the art can define other control signals that may be utilized separately or combined to function similarly to the embodiments described, and use these alternative signals to create a method or system according to the principles of this invention. Thus, the invention is limited only by the following claims.

We claim:

1. A method for generating a sampling control signal in an optical recording system, the method comprising:

generating a first power command signal in response to an internal data signal;

enabling a laser when the first power command signal transitions in a first direction, wherein the enabled laser directs a beam onto an optical storage medium, whereby the beam is reflected and used to create a reflected laser power signal representative of the power of the enabled laser;

disabling the laser when the first power command signal transitions in a second direction, opposite the first direction;

enabling the sampling control signal with a first delay after the first power command signal transitions in the first direction;

disabling the sampling control signal with a second delay after the first power command signal transitions in the second direction; and sampling the reflected laser signal when the sampling control signal is enabled.

2. The method of claim 1, further comprising programming the first delay and the second delay.

3. The method of claim 2, further comprising;

selecting the first and second delays in response to the characteristics of the reflected laser power signal.

4. The method of claim 2, wherein the step of programming the first and second delays comprises writing values representative of the first and second delays to one or more registers.

5. The method of claim 1, further comprising:
enabling a second sampling control signal with a third delay after the first power command signal transitions in the second direction; and
disabling the second sampling control signal with a fourth delay after the first power command signal transitions in the first direction.

6. The method of claim 5, further comprising:
sampling the reflected laser power signal when the second sampling control signal is enabled.

7. The method of claim 6, further comprising programming the first, second, third and fourth delays.

8. The method of claim 7, wherein the step of programming the first, second, third and fourth delays comprises writing values representative of the first, second, third and fourth delays to one or more registers.

9. The method of claim 1, wherein the internal data signal is an internal eight-to-fourteen modulation signal (EFM).

10. The method of claim 9, wherein the first power command signal undergoes a transition in the first direction after the internal EFM signal undergoes a transition in the first direction.

11. The method of claim 1, wherein the internal data signal is generated in response to a clock signal having an associated period T, wherein the first delay has a value in the range of 0T to 63/8 T.

12. The method of claim 1, wherein the internal data signal is generated in response to a clock signal having an associated period T, wherein the second delay has a value in the range of 0T to 63/8 T.

13. The method of claim 1, wherein the sampling control signal is a runtime optimum power control (ROPC) signal.

14. The method of claim 5, wherein the second sampling control signal a read sample (RESMP) signal.

15. An optical recording system comprising:
a write strategy circuit configured to provide a first power command signal in response to an internal data signal, wherein the first power command signal enables a laser when the first power command signal transitions in a first direction, and disables the laser when the first power command signal transitions in a second direction, opposite the first direction;
a first delay circuit configured to enable a sampling control signal with a first delay after the first power command signal transitions in the first direction; and
a second delay circuit configured to disable the sampling power control signal with a second delay after the first power command signal transitions in the second direction; and
a sample and hold circuit configured to sample a reflected laser power signal when the sampling control signal is enabled, wherein the reflected laser power signal is representative of the actual power of the laser.

16. The system of claim 15, wherein the first and second delay circuits are programmable, whereby the first and second delays are programmable.

17. The system of claim 15, further comprising:
a third delay circuit configured to enable a second sampling control signal with a third delay after the first power command signal transitions in the second direction; and
a fourth delay circuit configured to disable the second sampling power control signal with a fourth delay after the first power command signal transitions in the first direction; and
a sample and hold circuit configured to sample the reflected laser power signal in response to the second sampling control signal.

18. The system of claim 17, wherein the third and fourth delay circuits are programmable, whereby the third and fourth delays are programmable.

19. The system of claim 15, wherein the internal data signal is an internal eight-to-fourteen modulation signal (EFM).

20. The system of claim 15, wherein the internal data signal is generated in response to a clock signal having an associated period T, and wherein the first delay circuit is programmable to allow the first delay to have a value in the range of 0T to 63/8 T.

21. The system of claim 15, wherein the internal data signal is generated in response to a clock signal having an associated period T, wherein the second delay circuit is programmable to allow the first delay to have a value in the range of 0T to 63/8 T.

22. The system of claim 15, wherein the sampling control signal is a runtime optimum power control (ROPC) signal.

23. The system of claim 17, wherein the second sampling control signal a read sample (RESMP) signal.

24. A system for generating a sampling control signal in response to an internal data signal, the system comprising:
means for defining a first power command signal in response to the internal data signal;
means for enabling a laser when the first power command signal transitions in a first direction;
means for disabling the laser when the first power command signal transitions in a second direction, opposite the first direction;
means for enabling the sampling control signal with a first delay after the first power command signal transitions in the first direction; and
means for disabling the sampling control signal with a second delay after the first power command signal transitions in the second direction.

25. The system of claim 15, further comprising means for directing a beam from the laser onto an optical storage medium, wherein the beam is reflected and used to create the reflected laser power signal.

* * * * *

UNITED STATES PATENT AND TRADEMARK OFFICE
CERTIFICATE OF CORRECTION

PATENT NO. : 7,167,432 B2  Page 1 of 1
APPLICATION NO. : 10/107595
DATED : January 23, 2007
INVENTOR(S) : Kevin Chiang et al.

It is certified that error appears in the above-identified patent and that said Letters Patent is hereby corrected as shown below:

Title page, Item (75), Inventors: replace "Kouchin" with -- Kuochin --.

Column 1, line 66, replace "writtern" with -- written --.

Column 2, line 45, replace "siynal" with -- signal --.

Claim 14, Column 11, line 38, insert -- is -- after "signal" (first occurrence).

Claim 23, Column 12, line 35, insert -- is -- after "signal" (first occurrence).

Signed and Sealed this

Seventh Day of August, 2007

JON W. DUDAS
*Director of the United States Patent and Trademark Office*